(12) United States Patent
Huang et al.

(10) Patent No.: US 10,818,286 B2
(45) Date of Patent: *Oct. 27, 2020

(54) COMMUNICATION SYSTEM AND METHOD BETWEEN AN ON-VEHICLE VOICE RECOGNITION SYSTEM AND AN OFF-VEHICLE VOICE RECOGNITION SYSTEM

(71) Applicant: HONDA MOTOR CO., LTD., Minato-ku, Tokyo (JP)

(72) Inventors: Ritchie Huang, Ashburn, VA (US); Pedram Vaghefinazari, Long Beach, CA (US); Stuart Yamamoto, Hacienda Heights, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 209 days.

This patent is subject to a terminal disclaimer.

(21) Appl. No.: 15/833,535

(22) Filed: Dec. 6, 2017

(65) Prior Publication Data

US 2018/0096685 A1 Apr. 5, 2018

Related U.S. Application Data

(60) Division of application No. 15/445,514, filed on Feb. 28, 2017, now Pat. No. 10,269,348, which is a (Continued)

(51) Int. Cl.
*G10L 15/22* (2006.01)
*G10L 15/30* (2013.01)
(Continued)

(52) U.S. Cl.
CPC ............. *G10L 15/22* (2013.01); *G10L 15/01* (2013.01); *G10L 15/30* (2013.01); *G10L 17/22* (2013.01);
(Continued)

(58) Field of Classification Search
CPC ......... G10L 15/00; G10L 15/20; G10L 15/22; G10L 15/26; G10L 15/30; G10L 15/083;
(Continued)

(56) References Cited

U.S. PATENT DOCUMENTS 5,926,790 A   7/1999  Wright
5,960,399 A   9/1999  Barclay et al.
(Continued)

FOREIGN PATENT DOCUMENTS

CN    101217584 A    7/2008
EP    1 617 410 A1   1/2006
(Continued)

OTHER PUBLICATIONS

Japanese Office Action of related Japanese application No. 2017-002835 dated Jan. 12, 2018.
(Continued)

*Primary Examiner* — Edgar X Guerra-Erazo
(74) *Attorney, Agent, or Firm* — Arent Fox LLP

(57) ABSTRACT

A vehicle based system and method for receiving voice inputs and determining whether to perform a voice recognition analysis using in-vehicle resources or resources external to the vehicle.

12 Claims, 8 Drawing Sheets

Related U.S. Application Data continuation of application No. 15/179,611, filed on Jun. 10, 2016, now Pat. No. 9,620,121, which is a continuation of application No. 14/866,063, filed on Sep. 25, 2015, now Pat. No. 9,564,132, which is a continuation of application No. 13/805,921, filed as application No. PCT/US2011/041729 on Jun. 24, 2011, now Pat. No. 9,263,058.

(60) Provisional application No. 61/358,407, filed on Jun. 24, 2010.

(51) Int. Cl.
    *G10L 21/06*     (2013.01)
    *G10L 17/22*     (2013.01)
    *G10L 15/01*     (2013.01)
    *G10L 25/72*     (2013.01)

(52) U.S. Cl.
CPC .............. *G10L 21/06* (2013.01); *G10L 25/72* (2013.01); *G10L 2015/223* (2013.01); *G10L 2015/228* (2013.01)

(58) Field of Classification Search
CPC ......... G10L 2015/223; G10L 2015/228; G10L 17/00; G10L 17/22
See application file for complete search history.

(56) References Cited

U.S. PATENT DOCUMENTS

| | | | |
|---|---|---|---|
| 6,230,138 | B1 | 5/2001 | Everhart |
| 6,351,698 | B1 | 2/2002 | Kubota et al. |
| 6,438,465 | B2 | 8/2002 | Obradovich et al. |
| 6,505,161 | B1 | 1/2003 | Brems |
| 6,570,495 | B1 | 5/2003 | Lavelle et al. |
| 6,587,824 | B1 | 7/2003 | Everhart et al. |
| 6,663,846 | B1 | 12/2003 | McCombs et al. |
| 6,745,151 | B2 | 6/2004 | Marko et al. |
| 7,016,836 | B1 | 3/2006 | Yoda |
| 7,026,957 | B2 | 4/2006 | Rubenstein |
| 7,240,010 | B2 | 7/2007 | Papadimitriou |
| 7,373,248 | B2 | 5/2008 | Schalk |
| 7,516,072 | B2 | 4/2009 | Campbell et al. |
| 7,634,357 | B2 | 12/2009 | Schalk |
| 7,657,433 | B1 | 2/2010 | Chang |
| 7,689,253 | B2 | 3/2010 | Basir |
| 7,739,031 | B2 | 6/2010 | Tengler et al. |
| 7,801,730 | B1 | 9/2010 | Miyazaki et al. |
| 7,813,771 | B2 | 10/2010 | Escott |
| 7,822,614 | B2 | 10/2010 | Koyama |
| 7,826,945 | B2 | 11/2010 | Zhang et al. |
| 7,881,934 | B2 | 2/2011 | Endo et al. |
| 7,962,337 | B2 | 6/2011 | Steinbiss |
| 8,117,033 | B2 | 2/2012 | Cohen et al. |
| 8,140,255 | B2 | 3/2012 | Furumoto et al. |
| 8,285,545 | B2 | 10/2012 | Lee et al. |
| 8,294,683 | B2 | 10/2012 | Ranford et al. |
| 8,407,051 | B2 | 3/2013 | Inoue et al. |
| 8,447,598 | B2 | 5/2013 | Chutorash et al. |
| 8,548,806 | B2 | 10/2013 | Nagashima |
| 8,738,287 | B2 | 5/2014 | Schalk |
| 8,751,241 | B2 | 6/2014 | Oesterling et al. |
| 8,880,402 | B2 | 11/2014 | Wasson et al. |
| 8,942,888 | B2 | 1/2015 | Garrett et al. |
| 2001/0020202 | A1 | 9/2001 | Obradovich |
| 2002/0055845 | A1 | 5/2002 | Ueda et al. |
| 2002/0067839 | A1 | 6/2002 | Heinrich |
| 2002/0069071 | A1 | 6/2002 | Knockeart et al. |
| 2002/0156570 | A1 | 10/2002 | Ohtsuji et al. |
| 2003/0023432 | A1 | 1/2003 | Kyomitsu |
| 2003/0074199 | A1 | 4/2003 | Kuzunuki et al. |
| 2004/0010409 | A1 | 1/2004 | Ushida et al. |
| 2004/0030553 | A1 | 2/2004 | Ito et al. |
| 2004/0117179 | A1 | 6/2004 | Balasuriya |
| 2004/0192384 | A1 | 9/2004 | Anastasakos |
| 2005/0054386 | A1 | 3/2005 | Chung |
| 2005/0096905 | A1 | 5/2005 | Steinbiss |
| 2005/0179540 | A1 | 8/2005 | Rubenstein |
| 2006/0190097 | A1 | 8/2006 | Rubenstein |
| 2007/0162282 | A1 | 7/2007 | Odinak |
| 2007/0219807 | A1 | 9/2007 | Schalk et al. |
| 2008/0048908 | A1 | 2/2008 | Sato |
| 2008/0086260 | A1 | 4/2008 | Lee et al. |
| 2008/0126091 | A1 | 5/2008 | Clark et al. |
| 2008/0177551 | A1 | 7/2008 | Schalk |
| 2009/0055180 | A1 | 2/2009 | Coon et al. |
| 2009/0271200 | A1* | 10/2009 | Mishra ................... G01C 21/36 704/254 |
| 2009/0287477 | A1 | 11/2009 | Maes |
| 2010/0042498 | A1 | 2/2010 | Schalk |
| 2010/0057450 | A1 | 3/2010 | Koll |
| 2010/0057465 | A1* | 3/2010 | Kirsch ............... G01C 21/3629 704/260 |
| 2010/0088093 | A1 | 4/2010 | Lee et al. |
| 2010/0097178 | A1 | 4/2010 | Pisz et al. |
| 2010/0106497 | A1 | 4/2010 | Phillips |
| 2010/0127996 | A1 | 5/2010 | Kitahara et al. |
| 2010/0185392 | A1 | 7/2010 | Schalk |
| 2010/0185447 | A1 | 7/2010 | Krumel et al. |
| 2010/0204987 | A1 | 8/2010 | Miyauchi |
| 2010/0250243 | A1 | 9/2010 | Schalk et al. |
| 2011/0074693 | A1 | 3/2011 | Ranford et al. |
| 2011/0119062 | A1 | 5/2011 | Dohan |
| 2011/0208525 | A1 | 8/2011 | Inoue et al. |
| 2012/0253823 | A1 | 10/2012 | Schalk et al. |

FOREIGN PATENT DOCUMENTS

| | | | | |
|---|---|---|---|---|
| JP | 2002-144982 | A | | 5/2002 |
| JP | 2002-182896 | A | | 6/2002 |
| JP | 2003-223188 | A | | 8/2003 |
| JP | 2004-045591 | A | | 2/2004 |
| JP | 2004-355118 | A | | 12/2004 |
| JP | 2005017709 | A | * 1/2005 | ............ G10L 15/00 |
| JP | 2005-284543 | A | | 10/2005 |
| JP | 2007-041089 | A | | 2/2007 |
| JP | 2009-75582 | A | | 4/2009 |
| JP | 2009-288630 | A | | 12/2009 |
| WO | WO 00/58942 | A1 | | 10/2000 |
| WO | WO 2005/024781 | A1 | | 3/2005 |
| WO | WO 2009/019783 | A1 | | 2/2009 |

OTHER PUBLICATIONS

Japanese Office Action of related Japanese Patent Application No. 2017-002835 dated Aug. 7, 2018.
Chinese 1st Office Action of Chinese Patent Application No. CN 201180037444.7, 10 pages, dated Mar. 26, 2014.
Chinese 2nd Office Action of Chinese Patent Application No. CN 201180037444.7, 9 pages, dated Jan. 21, 2015.
Communication pursuant to Article 94(3) EPC for European Patent Application No. EP 11798961.6, 4 pages, dated Jun. 24, 2015.
European Examination Report of European Patent Application No. 11798961.6, 5 pages, dated Sep. 24, 2014.
European Search Report of European Patent Application No. 11798961. 6, 3 pages, dated Aug. 29, 2014.
Hua, Z. et al., "Speech Recognition Interface Design for In-Vehicle System," Proceedings of the Second International Conference on Automotive Use Interfaces and Interactive Vehicular Applications (AutomotiveUI 2010), Pittsburgh, PA, United States, pp. 29-33, Nov. 11-12, 2010.
International Search Report and Written Opinion of International Patent Application No. PCT/US2011/041729, 14 pages, dated Oct. 27, 2011.
Japanese Office Action of related Japanese Patent Application No. 2013-516786 dated Mar. 22, 2016.
Kuhn, T. et al., "Hybrid In-Car Speech Recognition for Mobile Multimedia Applications," 1999 IEEE 49th Vehicular Technology Conference, vol. 3, pp. 2009-2013, May 16-20, 1999.

(56) References Cited

OTHER PUBLICATIONS

Bernstein D. Vidovic, N., & Modi, S. A cloud PAAS for high scale, function, and velocity mobile applications—with reference applications as the fully connected car. Systems and Networks Communciations (ICSNC). 2010 Fifth International Conference on, pp. 117-123. IEEE, Aug. 2010.

E. A. Bretz, "The car: just a Web browser with tires," IEEE Spectrum, vol. 38, No. 1, pp. 92-94, Jan. 2001.

* cited by examiner

COMMUNICATION SYSTEM AND METHOD BETWEEN AN ON-VEHICLE VOICE RECOGNITION SYSTEM AND AN OFF-VEHICLE VOICE RECOGNITION SYSTEM

CROSS-REFERENCE TO RELATED APPLICATIONS

This application is a divisional application of U.S. patent application Ser. No. 15/445,514, filed Feb. 28, 2017, which is a continuation application of U.S. patent application Ser. No. 15/179,611, filed Jun. 10, 2016, which is a continuation Ser. No. 14/866,063, filed Sep. 25, 2015, which is a continuation of U.S. application Ser. No. 13/805,921, filed on Dec. 20, 2012, which is a National Phase Entry of International Application No. PCT/US2011/041729, filed on Jun. 24, 2011, which claims the benefit of U.S. Provisional application 61/358,407 filed on Jun. 24, 2010, all of which applications are incorporated herein by reference.

FIELD OF THE INVENTION

The embodiment relates to the field of vehicle communication systems and methods.

BACKGROUND

Conventional vehicles employ audible, e.g., voice, commands to implement various vehicle features. A common problem is that due to limited processing capabilities in the vehicle, in-vehicle voice recognition systems are not as robust as external voice-recognition systems and can lead to inaccurate recognition results. However, employing external voice-recognition systems can lead to longer response times. What is needed is a system and method for voice recognition systems for a vehicle that provides a robust voice-recognition system while accounting for time-sensitive and context sensitive voice recognition in vehicles.

SUMMARY

A computer based method in a vehicle comprising the steps of receiving a first voice input, determining whether a voice recognition process should be performed to the first voice input by a computer based voice recognition system in the vehicle or using a voice recognition system that is external to the vehicle, performing the computer based voice recognition in the vehicle to the first voice input in response to the determination that the voice recognition process should be performed in the vehicle, and transmitting the first voice input to an external system in response to the determination that the voice recognition process should be performed external to the vehicle.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION

Figure 1:
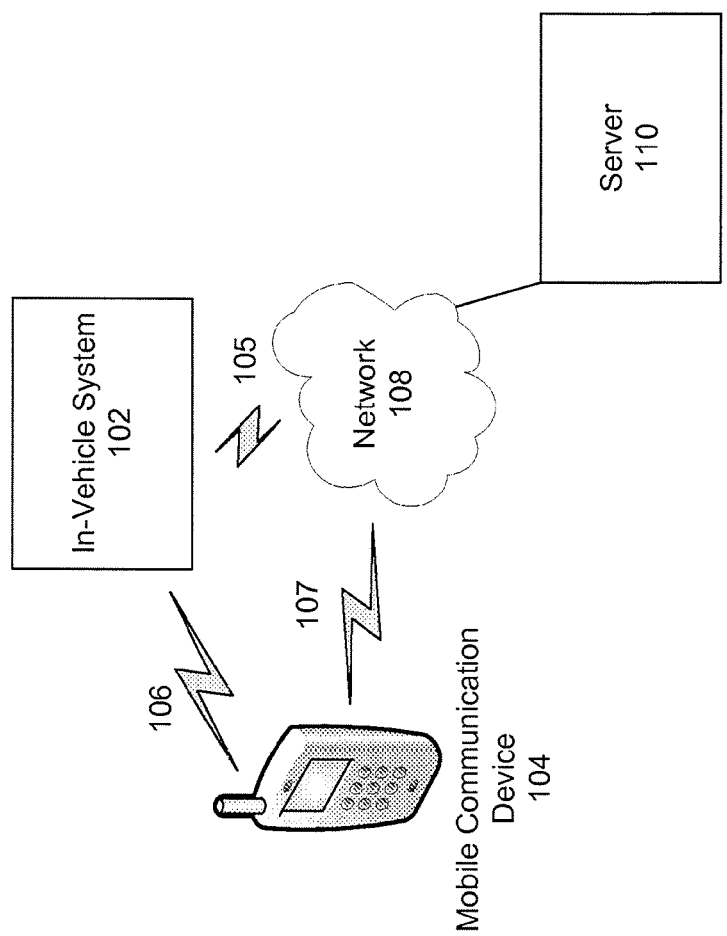
FIG. 1 is an environment in which embodiments can operate.

Embodiments are now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the present embodiments include process steps and instructions described herein in the form of an algorithm. It should be noted that the process steps and instructions of the present embodiments could be embodied in software, firmware or hardware, and when embodied in software, could be downloaded to reside on and be operated from different platforms used by a variety of operating systems. The embodiments can also be in a computer program product which can be executed on a computing system.

The present embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the present embodiment is not described with reference to any particular programming language. It will be appreciated that a variety of programming languages may be used to implement the teachings of the present embodiment as described herein, and any references below to specific languages are provided for disclosure of enablement and best mode of the present embodiment.

In addition, the language used in the specification has been principally selected for readability and instructional purposes, and may not have been selected to delineate or circumscribe the inventive subject matter. Accordingly, the disclosure of the present embodiment is intended to be illustrative, but not limiting.

FIG. 1 illustrates an exemplary operating environment 100 for various embodiments. Operating environment 100 may include an in-vehicle system 102, an optional wireless mobile communication device 104, an optional communication link 105 for communication between the in-vehicle system 102 and the network 108, an optional short-range communication link 106 for communication between the in-vehicle system 102 and wireless mobile communication device 104, an optional wireless networking communication link 107 between wireless mobile communication device 104 and a network 108, and a processing device, such as a server 110 connected to network 108. The communication links described herein can directly or indirectly connect two devices.

In-vehicle system 102 and wireless mobile communication device 104 may communicate with each other via a short-range communication link 106 which uses short-range communication technology, such as, for example, Bluetooth® technology or other short-range communication technology, for example, Universal Serial Bus (USB). In-vehicle system 102 and wireless mobile communication device 104 may connect, or pair, with each other via short-range communication link 106.

Examples of a mobile communication device (MCD) 102 include a cellular phone, personal device assistant (PDA), smart phone, laptop computer or other devices having a processor, communications capability and are easily transportable, for example. In a common form, the MCD 104 application could be part of a larger suite of vehicle features and interactions. Examples of applications include applications available for the iPhone™ that is commercially available from Apple Computer, Cupertino, Calif. or applications for phones running the Android™ operating system that is commercially available from Google, Inc., Mountain View, Calif.

In alternate embodiments a mobile communication device 104 is not utilized and instead a communication device embedded in the vehicle is used, such as a vehicle embedded phone, a wireless network card or other device (e.g., a Wi-Fi capable device). For ease of discussion the description herein describes the operation of the embodiments with respect to an embodiment using a mobile communication device 104. However, this is not intended to limit the scope of the embodiments and it is envisioned that other embodiments operate using other communication systems between the in-vehicle system 102 and the network 108, as described above.

In-vehicle system 102 may send information to wireless mobile communication device 104. Wireless mobile communication device 104 may send information to in-vehicle system 102 via short-range communication link 106. Wireless mobile communication device 104 may store information received from in-vehicle system 102, and/or may provide the information to a remote processing device, such as, for example, server 110, via network 108.

In some embodiments, in-vehicle system 102 may provide information to the wireless mobile communication device 104. Wireless mobile communication device 104 may use that information to obtain additional information from network 108 and/or server 110. The additional information may also be obtained in response to providing information with respect to a prompt on wireless mobile communication device 104 from in-vehicle system 102.

Network 108 may include a wireless communication network, for example, a cellular telephony network, as well as one or more other networks, such as, the Internet, a public-switched telephone network (PSTN), a packet-switching network, a frame-relay network, a fiber-optic network, and/or other types of networks.

Figure 2:
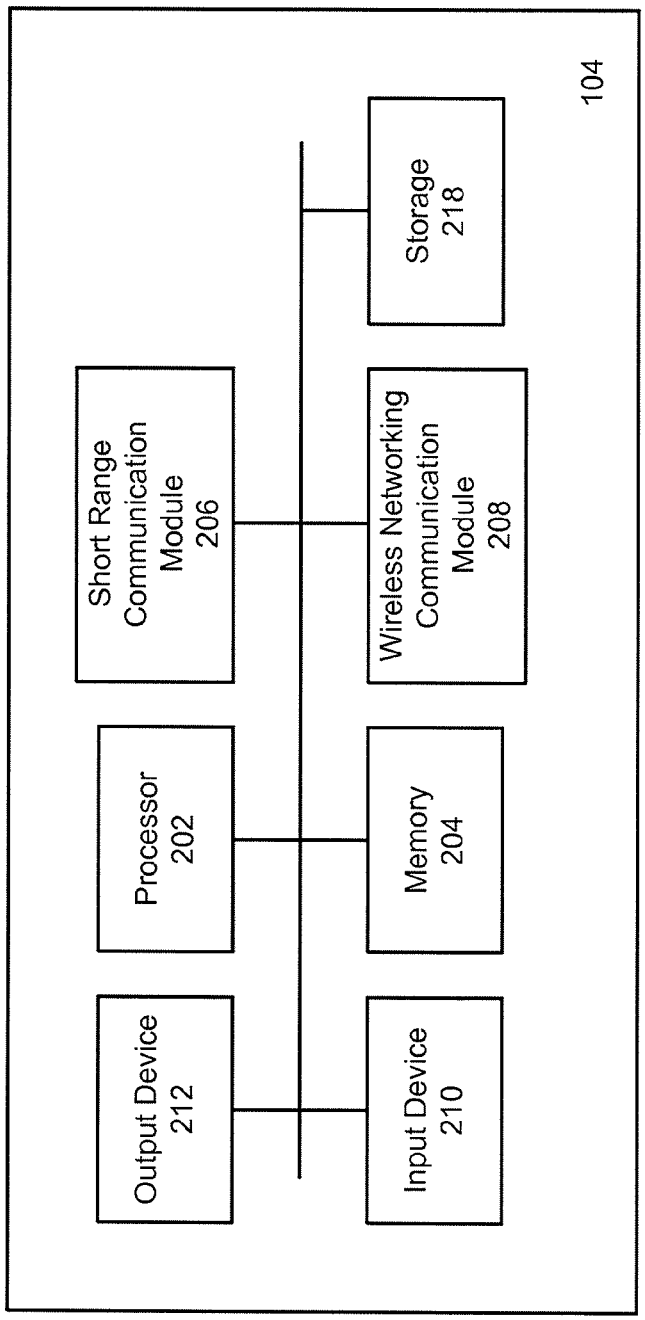
FIG. 2 is a more detailed illustration of the mobile communication device in accordance with an embodiment.

FIG. 2 is a functional block diagram of an exemplary embodiment of wireless mobile communication device 104. Wireless mobile communication device 104 may include a processor 202, a memory 204, a short-range communication module 206, a wireless networking communication module 208, an input device 210, an output device 212 and a storage device 218.

Processor 202 may include one or more conventional processors that interpret and execute instructions stored in a tangible medium, such as memory 204, or storage device 218 which can be a media card, flash RAM, or other tangible medium. As described herein, memory 204 may include random access memory (RAM) or another type of dynamic storage device, and read-only memory (ROM) or another type of static storage device, for storing this information and instructions for execution by processor 202. The RAM, or another type of dynamic storage device, may store instructions as well as temporary variables or other intermediate information used during execution of instructions by processor 202. The ROM, or another type of static storage device, may store static information and instructions for processor 202.

Short-range communication module 206 may include a first transceiver for transmitting and receiving information via a wireless short-range communication technology such as, for example, Bluetooth® or other short-range communication technology, for example, Universal Serial Bus (USB). Wireless networking communication module 208 may include a second transceiver for transmitting and receiving information via a wireless communication network, including but not limited to a cellular telephony network.

Input device 210 may include hard keys and/or soft keys, a microphone, a touch screen, and/or other input device. Output device 212 may include a speaker and/or a display.

Figure 3:
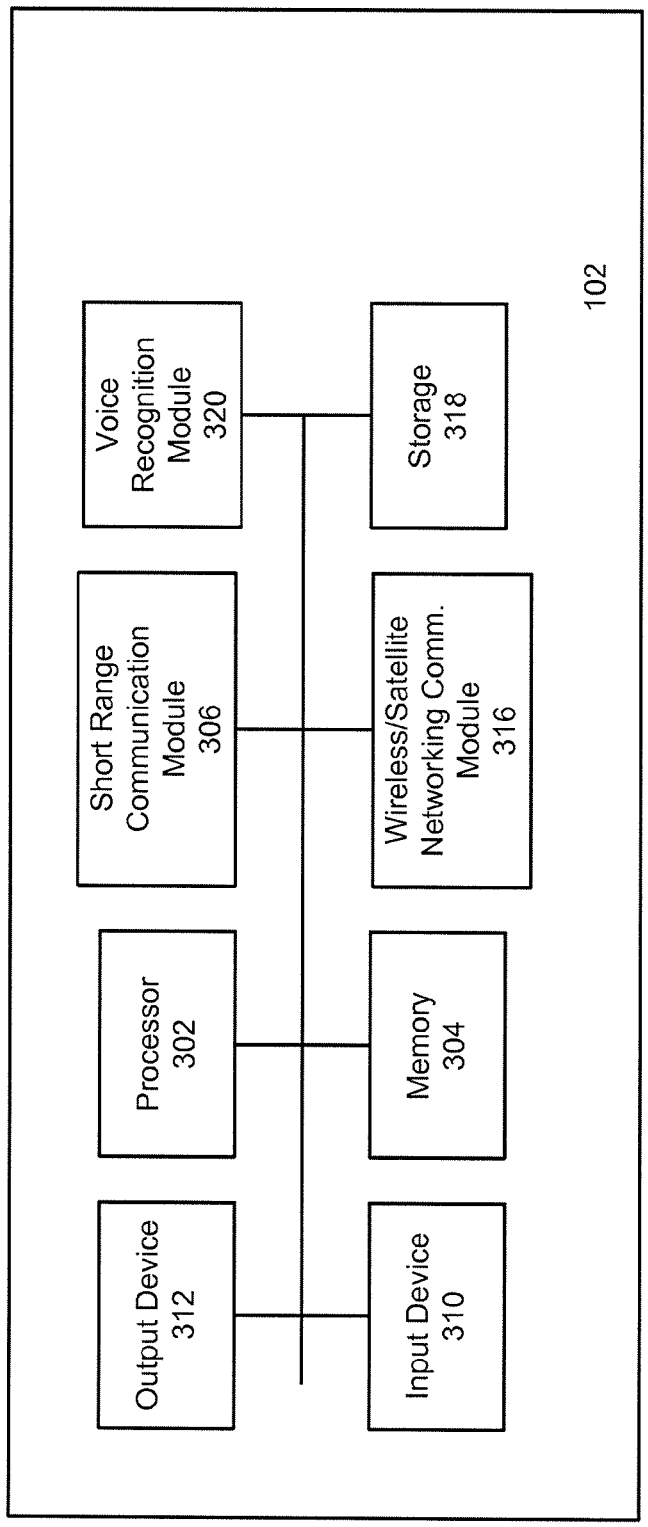
FIG. 3 is a more detailed illustration of the in-vehicle system in accordance with an embodiment.

FIG. 3 is a functional block diagram of an exemplary embodiment of in-vehicle system 102. In-vehicle system 102 may include processor 302, memory 304, short-range communication module 306, input device 310, output device 312, satellite communication module 316, storage device 318, and voice recognition module 320.

Processor 302 may include one or more conventional processors that interpret and execute instructions stored in a tangible medium, such as memory 304, a media card, flash RAM, or other tangible medium. Memory 304 may include random access memory (RAM), or another type of dynamic storage device, and/or read-only memory (ROM), or another type of static storage device, for storing information and instructions for execution by processor 302. RAM, or another type of dynamic storage device, may store instructions as well as temporary variables or other intermediate information used during execution of instructions by processor 302. ROM, or another type of static storage device, may store static information and instructions for processor 302, as described above Short-range communication module 306 may include a transceiver for transmitting and receiving information via a wireless short-range communication technology such as, for example, Bluetooth® or other short-range communication technology, for example, Universal Serial Bus (USB), Wi-Fi, etc.

Input device 310 may include hard keys and/or soft keys, a microphone, a touch screen, and/or other input device. Output device 312 may include a speaker and/or a display.

In some embodiments, components of in-vehicle system 102 may include a navigation unit for guiding a user of the vehicle, including in-vehicle system 102, to a destination. That is, at least some components of in-vehicle system 102 may function together as a navigation unit. When in-vehicle system 102 includes a navigation unit, in-vehicle system 102 may include a satellite communication module 316 for communicating with global positioning satellites. The navigation unit may also include a database of points of interest ("POIs"). The database may contain information about various places the user of the vehicle may want to travel to. The POIs may be arranged by category, such as, restaurants, shopping, emergency services, etc.

Voice recognition module 320 can include a separate processor, memory and/or storage or can use one or more of the processor 302, memory 304 and storage 318 in the vehicle. The voice recognition module 320 can store voice profiles of one or more users to enable it to recognize commands, requests and/or inquiries, for example, spoken by the one or more users.

Figure 4:
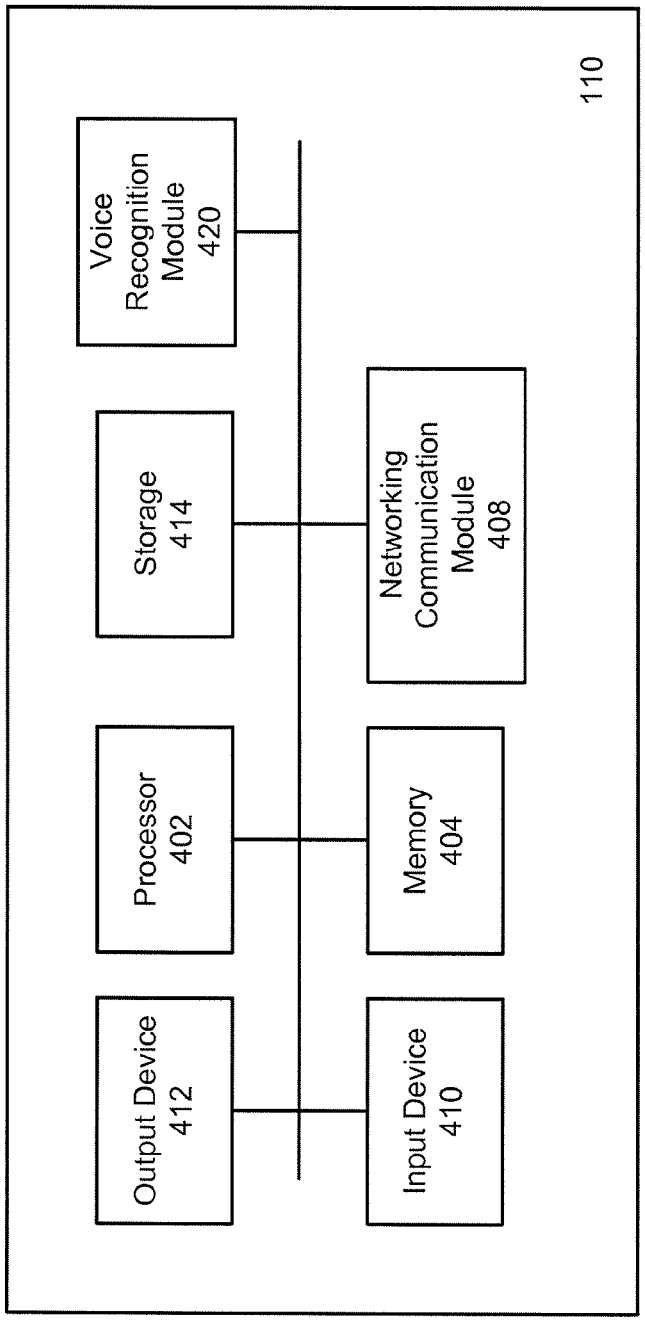
FIG. 4 is a more detailed illustration of a server device in accordance with an embodiment.

FIG. 4 is a functional block diagram of an exemplary embodiment of server 110. Server 110 may include a processor 402, a memory 404, a storage device 406, a networking communication module 408, an input device 410 and output device 412, a storage device 418 and a voice recognition module 420.

Processor 402 may include one or more conventional processors that interpret and execute instructions stored in a tangible medium, such as memory 404, a media card, flash RAM, or other tangible medium. As described herein, memory 404 may include random access memory (RAM) or another type of dynamic storage device, and read-only memory (ROM) or another type of static storage device. The RAM, or another type of dynamic storage device, may store instructions as well as temporary variables or other intermediate information used during execution of instructions by processor 402. The ROM, or another type of static storage device, may store static information and instructions for processor 402.

Voice recognition module 420 can include a separate processor, memory and/or storage or can use one or more of the processor 402, memory 404 and storage 414. The voice recognition module 420 can store voice profiles of one or more users to enable it to recognize commands, requests and/or inquiries, for example, spoken by the one or more users.

Networking communication module 408 may include a transceiver for transmitting and receiving information via a wired or wireless communication network, such as network 108 or other networks, e.g., a wide area network, local area network, Internet etc.

Figure 5:
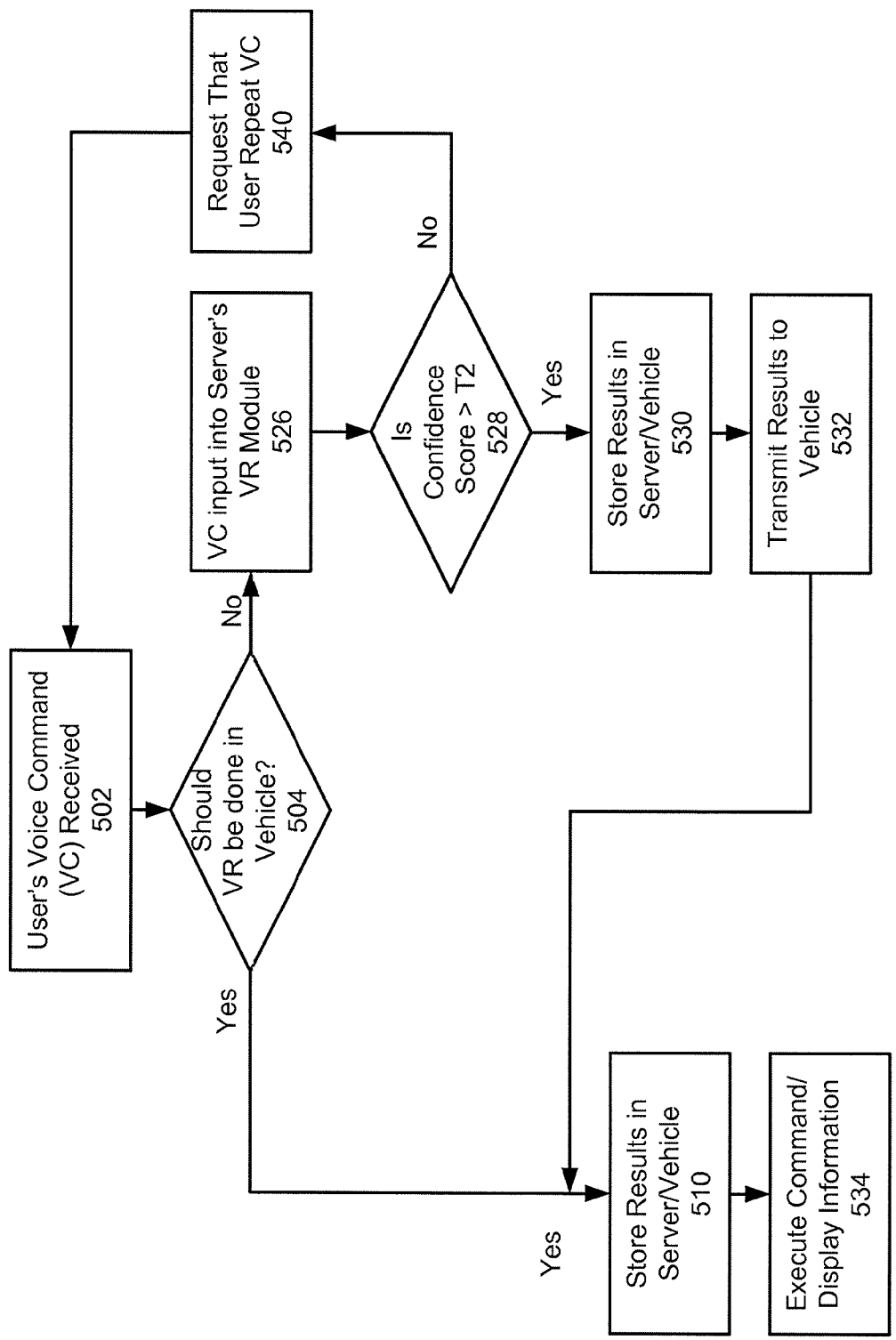
FIG. 5 is a flow chart illustrating the operation of a voice recognition system in accordance with an embodiment.

FIG. 5 is a flow chart illustrating the operation of a voice recognition system in accordance with an embodiment. A voice command (VC) is received 502 by the input device 310. An example is a user initiating a voice command by, for example, pressing a hard/soft key in the vehicle and then speaking a command, request, inquiry etc. For ease of discussion, a command is used as the example and includes any of such inputs. The voice command can be converted into and stored as a digital representation or stored as an analog representation. For ease of discussion a digital representation will be discussed herein. The vehicle determines whether the voice recognition should be done on-board by the vehicle or whether the voice recognition should be done off-board by an external voice recognition module 420, for example in server, 110, 820. Examples of the on and off-board voice recognition systems 320, 420 are ViaVoice that is commercially available from IBM Corporation, based in Armonk, N.Y., Nuance voice recognition that is commercially available from Nuance Communications, based in Burlington, Mass. and Voice Box voice recognition that is commercially available from VoiceBox Technologies based in Bellevue, Wash.

Figure 6:
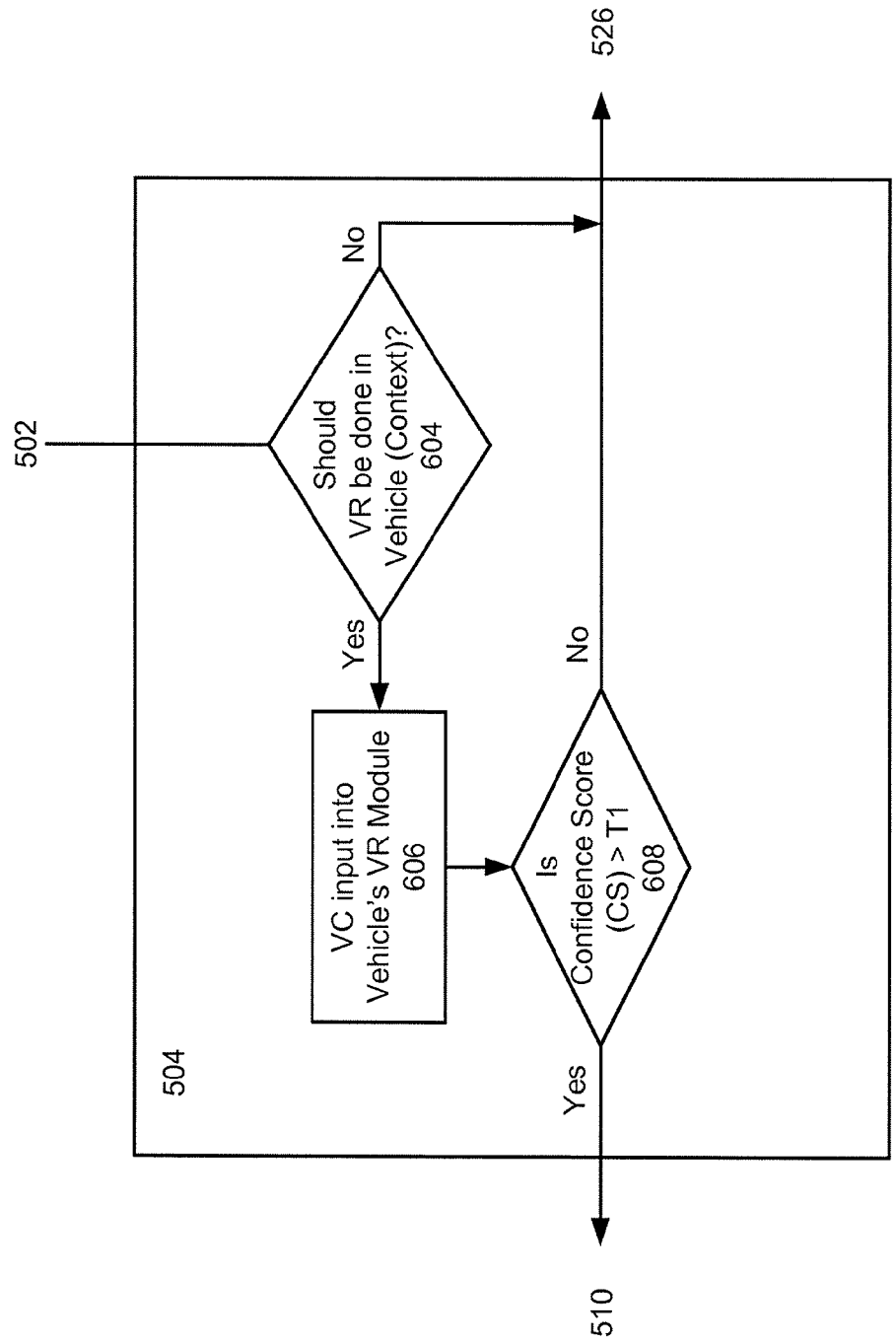
FIG. 6 is a flow chart illustrating the operation of step 504 in accordance with an embodiment.
Figure 7:
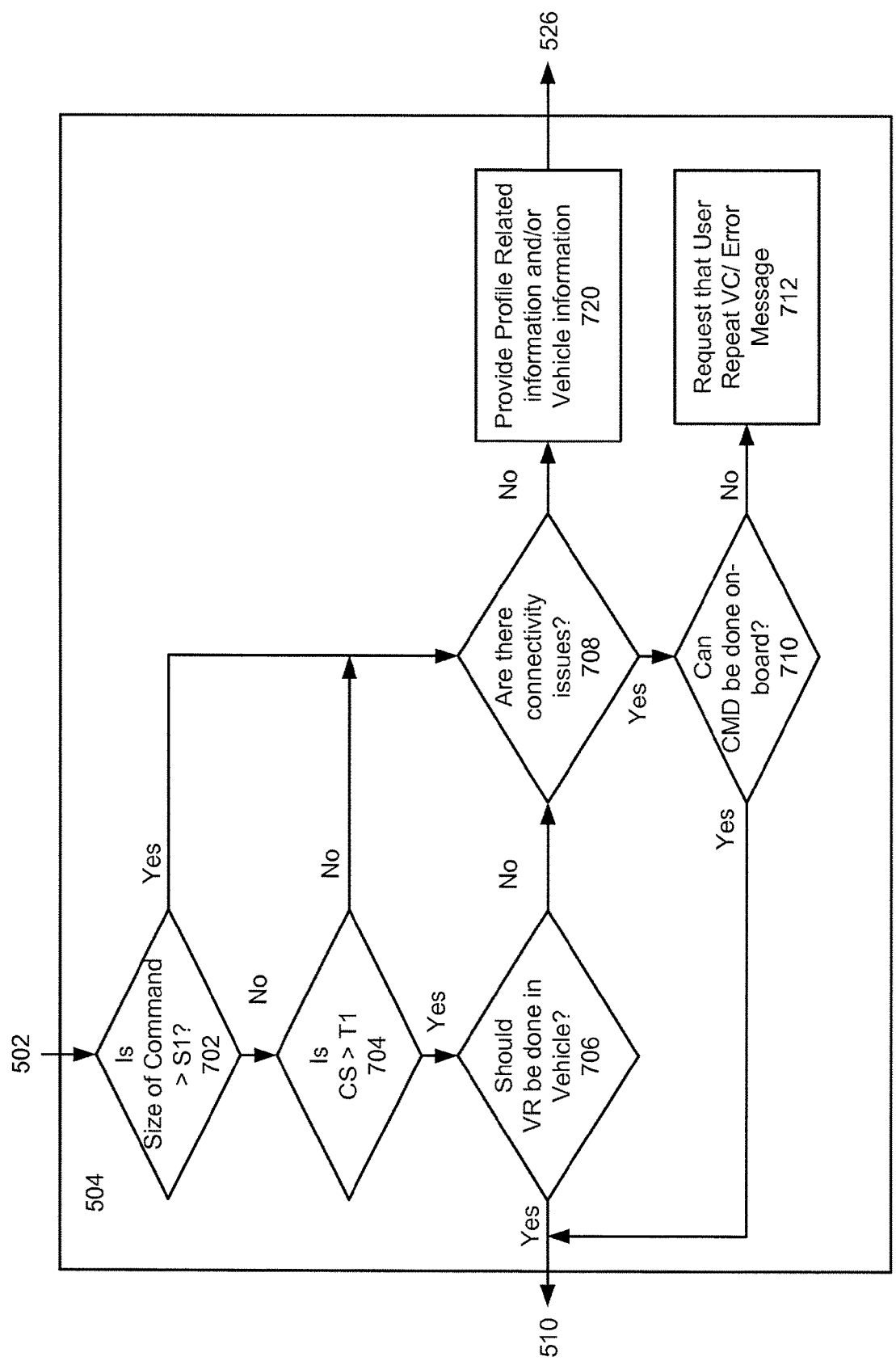
FIG. 7 is a flow chart illustrating the operation of step 504 in accordance with an embodiment.

The processor 302 receives an input signal from the input device 310 and identifies the context of the request. For example, the context can be based upon the hard/soft key pressed (phone call hard/soft key or the global commands hard/soft key) and/or based upon the information displayed in the output device 312 (e.g., navigation, audio, video). The in-vehicle system 102 determines 504 whether the voice recognition should be done using the in-vehicle voice recognition module 320 or the external voice recognition module 420. FIGS. 6 and 7 are examples of how this determination can be made.

FIG. 6 is a flow chart illustrating the operation of step 504 in accordance with an embodiment. In this embodiment the determined context may be used to determine 604 whether the voice recognition (VR) should be performed using the in-vehicle voice recognition module 320 or the external voice recognition module 420. For example, in vehicles where voice control is correlated with information on a display screen, if the display screen shows the playing of an audio disc, e.g., a CD or DVD, then the in-vehicle system determines that the context of the voice command is related to the on-board audio system and therefore should be analyzed on-board because the analysis will be quicker, more reliable and the accuracy is typically high.

If 604 the initial decision is to perform the voice recognition on-board then the voice command (VC) is input 606 into the in-vehicle voice recognition module 320. The in-vehicle voice recognition module 320 analyzes the voice command using voice recognition techniques. Many possible voice recognition techniques can be used. One example of a determining confidence scores is set forth in Jiang, Confidence measures for speech recognition: A survey. 2004 Speech Communication, and available at www.sciencedirect.com which is incorporated by reference herein in its entirety.

If 608 the confidence score determined by the voice recognition module 320 is greater than a first threshold (T1) then the process continues with step 510 in which the results of the voice recognition analysis can be stored 510 in the vehicle in a voice profile (and optionally also sent to the server 110 for storing in a voice profile located off the vehicle) associated with the user or the driver of the vehicle. Thereafter, the command can be executed 534 or the information requested can be presented to the user.

If 608 the confidence score determined by the voice recognition module 320 does not exceed the first threshold (T1), this indicates that the on-board voice recognition module did not produce a satisfactory result and, in this embodiment, the voice command is transmitted to the external voice recognition module 420 which may have more processing power and may therefore be able to determine the meaning of the voice command with a higher confidence score. The process then continues with step 526, described below. Additional information may be sent along with the voice command as described below with reference to step 720.

It should be understood that the first threshold (T1) could be one of many thresholds, where each individual threshold could have its own outcome. For example, the confidence score may be so low that the system would require the user to repeat the command without any other action being performed.

FIG. 7 is a flow chart illustrating the operation of step 504 in accordance with an embodiment. The steps shown in FIG. 7 are not all required and need not be done in the order shown. They can also be combined with the steps shown in FIG. 6. The in-vehicle system 102 determines 504 whether the voice recognition should be done using the in-vehicle voice recognition module 320 or the external voice recognition module 420. The in-vehicle system 102 receives the voice command (step 502). The in-vehicle system 102 determines a characteristic of the command and/or voice, e.g., voice type, frequency, speed, prosody, intelligibility, tone, pitch, size, direction, volume, and/or duration. For example, is the command less than about five seconds, is the voice a female or male voice, or is the speaker speaking fast. In the embodiment shown in FIG. 7, size is used as the example and will be described further below. These examples are merely exemplary and any duration or other factors can be used. If 702 the size of the command is too large, e.g., it exceeds a first size factor Si, then the in-vehicle system 102 continues with step 708. An example of a command having a long duration is one where the user wants to request the sending of a long text message. If 702 the size is not too large then the in-vehicle system 102 uses the in-vehicle voice recognition module 320 to determine the confidence score (CS). If 704 the confidence score does not exceed a first threshold (T1) then the in-vehicle system 102 continue with step 708.

If the confidence score exceeds the first threshold (T1) then the command/request is known with enough confidence to proceed. The in-vehicle system then determines 706 whether the determined command/request should be performed in the vehicle or outside the vehicle. For example, in some embodiments certain commands/requests should be interpreted in the vehicle, such as audio control commands, peripheral control commands, environmental commands (e.g., modification of internal temperature, fan speed), static data, emergency related requests (e.g., a request to call 911 or a request for information about the nearest hospital), HandsFreeLink® (HFL) commands, and address entry. Examples of commands/requests that should be performed externally includes obtaining news or other dynamic data, sending an email or text message, purchasing tickets to an event, making reservations, searching for a point of interest, or obtaining weather information or real-time traffic information.

If 706 the determined command/request is one that should be performed in the vehicle then the process continues with step 510, described herein.

If 706 the command is not one that should be done on board, e.g., getting real-time traffic information or details about the operating hours of a restaurant, then the in-vehicle system 102 determines 708 whether there are any connectivity issues related to any of the communication links 105, 106, 107, between the in-vehicle system 102 and the server 110. If 708 there are communication problems such that data is not able to be accurately transmitted and received then the in-vehicle system 102 determines 710 whether the identified command can be performed on-board the vehicle. If it can then the process continues with step 510. If 710 the identified command cannot be done on-board or if the command is unknown then the in-vehicle system 102 communicates 712 with the user to ask the user to repeat the voice command, if the command is unknown (e.g., as a result of being too large or having a low confidence factor). Alternatively an error message can be communicated 712 indicating that connectivity issues prevent the command from being performed currently. In alternate embodiments, the in-vehicle system 102 stores the voice command and transmits the request to the server 110 when the connectivity problems no longer exist.

If 708 there are no connectivity issues the in-vehicle system transmits the voice command and can provide 720 additional user profile related information and/or vehicle information that can be used by the external voice recognition module 420. The types of information that can be included in the transmission 720 are described in greater detail below. The process then continues with step 526.

If the voice recognition is to be performed in the server based upon the decision in step 504, then the external voice recognition module 420 performs 526 a voice recognition analysis of the received command. The external voice recognition module 420 in the server can be a more powerful analysis engine/module as the processor 402 can be more powerful, there can be more data available in memory 404 and storage 414 and additional resources from other networks can be utilized. In addition, multiple user profiles associated with the vehicle can be used to assist in accurately interpreting the user's command/request, as described below. If 528 the confidence score determined by the external voice recognition module 420 exceeds a second threshold (T2, which may be different than T1), then the results of the voice recognition can be stored 530 in the server 110 and the results can be transmitted 532 to the vehicle where the results can also be stored 510 in the vehicle. The vehicle can then execute 534 the identified command (or communicate the requested information). The results stored in the server and/or vehicle can be used to provide feedback to the voice recognition modules 320, 420 in order to improve future performance.

If, 528, the confidence score determined by the external voice recognition module 420 does not exceed the second threshold (T2), then the user may be requested 540 to repeat the voice command and the process repeats beginning at step 502.

In another embodiment the voice command is sent to both the in-vehicle voice recognition module 320 and the external voice recognition module 420. The results are collected by the in-vehicle system 102 and the result is communicated to the user. In the situation where the results of the voice recognition differ, then the value of the confidence score for each can be compared and the result having the higher confidence score can be used. Alternatively, a default can be used where the result of the external voice recognition module 320 is used as it is presumed to have more resources with which to analyze the voice command and therefore is likely to be more accurate. In the situation where the result from the in-vehicle voice recognition module 320 is communicated to the user or the command is performed before the in-vehicle system 102 receives the result from the external voice recognition module 320, the in-vehicle system can ignore the later result, communicate the later result to the user or the later command can be performed.

As described above, if 708 there are no connectivity issues the in-vehicle system transmits the voice command and can provide 720 additional user profile related information and/or vehicle information that can be used by the external voice recognition module 420. When a voice command is sent to the external voice recognition module 420 current embodiments provide additional information that can be used by the external voice recognition module 420 to identify the speaker and to more accurately recognize the voice command when compared to situations when this information is not available to the external voice recognition module 420.

In an embodiment the external voice recognition module 420 may include a user profile for the vehicle. In alternate embodiments there may be multiple user profiles associated with the vehicle where each user profile assists the external voice recognition module 420 perform voice recognition of the voice command. For example, a profile may include information such as a user's accent, pronunciation, sentence structure, speech training data, information about the tendencies of a user, e.g., one user of the vehicle may frequently go for coffee at one store, while another user typically goes to another.

In various embodiments the in-vehicle system 102 assists the external voice recognition module 420 by (a) providing information 720 that can be used to assist in identifying the proper user profile and/or (b) providing additional information 720 about the vehicle model and state that can be used to provide an acoustic model of the vehicle at the time of the voice command to assist in increasing the accuracy of the voice recognition. Information that can be provided 720 to assist the external voice recognition module 420 in identifying the proper user profile include: key fob identification (when a vehicle has multiple key fobs), cell phone identification number or phone number when paired to the vehicle, vehicle/navigation unit identification number, user information such as facial features (using facial recognition) and/or weight the driver applies to the seat when driving (can differentiate between drivers of different weights), vehicle location information from a GPS in the vehicle—the location can be used to assist in identifying habits of drivers having profiles associated with the vehicle. For example, driver 1 works in Torrance, Calif. and driver 2 works in Anaheim, Calif., when the location of the vehicle is in/near Torrance the external voice recognition module 420 may be able to use the location information to more accurately determine that driver 1 is the speaker and therefore the profile associated with driver 1 should be used when performing voice recognition. Examples of additional information that can be included are: the user's name if spoken or selected using a screen, vehicle climate control data, speed data, time of day, braking patterns, any other vehicle-related/ generated data, the distance between the vehicle and the vehicle immediately in front or other vehicle information that may be helpful to the external voice recognition module 420 in differentiating the tendencies of two drivers and therefore to more accurately identify the particular user which will assist in recognizing the voice command. This information is sent in addition to the voice command and is therefore in addition to inherent characteristics of the voice command such as frequency of the voice command.

Additional information that may be used by the external voice recognition module 420 relates to the acoustics of the vehicle. The information provided 720 can include the model of the vehicle, the vehicle identification number/ navigational identification number which enables a predetermined acoustical model to be used based upon the vehicle when attempting to recognize the voice command. In addition, the speed, yaw, vehicle location (is the road noisy), status of fans (high, low, off), number of passengers, window position, and/or any other vehicle-related/generated data can be used by the external voice recognition module 420 to adjust the acoustical model to more accurately reflect the conditions present in the vehicle when the voice command was made. This information 720 can also be used by the in-vehicle voice recognition module 320.

Figure 8:
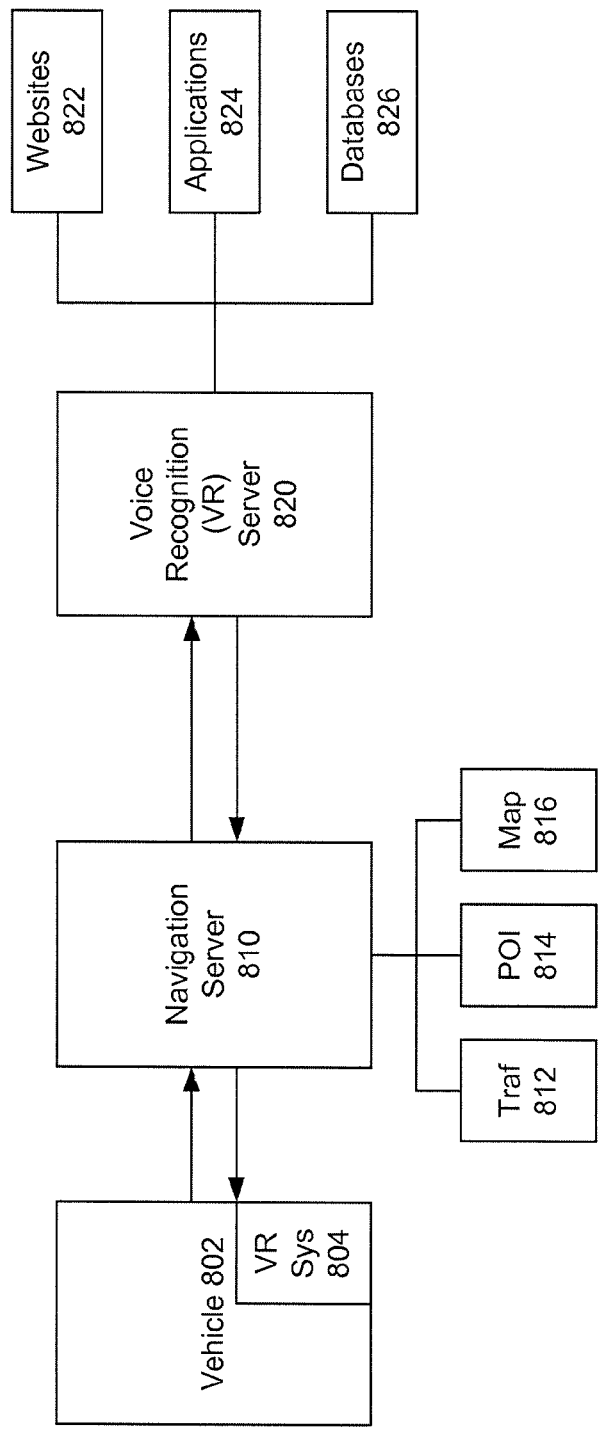
FIG. 8 is an illustration of the system that responds to a users command/request for information in accordance with an embodiment.

FIG. 8 is an illustration of the system that responds to a users command/request for information in accordance with an embodiment. In this embodiment the vehicle voice recognition/control system and method described above can be used to assist a user in obtaining requested information or performing requested commands. FIG. 8 is an illustration of a system in accordance with one embodiment. The system includes a vehicle 802 that includes an on-board voice recognition (VR) system 804 (similar to on-board voice recognition module 320). Examples of such a VR system are described above.

The vehicle 802 is optionally wirelessly coupled to a navigation server 810 via a communications link. The navigation server 810 can optionally include or be coupled, either directly or indirectly, to a traffic database 812, a point of interest database 814 and/or a map database 816.

The vehicle 802 and/or the navigational server 810 are coupled to a voice recognition server 820. The voice recognition server 820 can be coupled to other databases, the interne and/or to programs/applications. In an embodiment a user can set preferences for the applications 824, websites 822, databases 826 that the user wants the voice recognition server 820 to use. Examples include ESPN, Yelp, Flixster, Open Table, Google, CNN, Yahoo, etc. These preferences can be set in advance or can be set/modified using the voice recognition server 820.

In an embodiment a user requests information or an action. For example, the user may request "Please make a reservation for four at seven p.m. at a good Japanese restaurant." The verbal request along with additional information 720 is transmitted from the vehicle 802 to the navigational server 810 and/or the voice recognition server 820. The additional information 720 transmitted can include user information, vehicle information, speed, location, time of day, planned routing information in addition to information sent in accordance with embodiments described herein.

The voice recognition server 820 receives the voice information/command and additional information and performs conventional voice recognition, such as that described above, to gather the information and/or perform the command requested. By sending location, speed, time of day and/or planned routing information the vehicle enables the voice recognition server 820 or the vehicle 802 to account for the vehicle's changing position and direction of travel.

For example, a user in a vehicle traveling southbound likely would prefer to identify a restaurant that is in the direction of travel instead of one that would require backtracking. In an embodiment, this preference can be selected by the user. In an embodiment, the voice recognition server 820 or vehicle can also determine an estimated location at a particular time based on, for example, a selected routing path. For example, in the above example, if the user has selected a destination and the vehicle has a routing path that then the vehicle can estimate the location of the vehicle near the time of the reservation, e.g., 7:00 pm, to assist the voice recognition server in determining which restaurant to select. In another example, the voice recognition server 820 and/or the vehicle 802 can use the routing information and location information to select information, e.g., a restaurant that is near the planned route.

After performing voice recognition on the user's verbal request, the voice recognition system 820 identifies one or more sources of information and connects to these sources. In an embodiment the voice recognition system 820 uses the user preference information, described above. The voice recognition system can connect to Internet websites 822, applications 824 and/or databases 826 to obtain the information. In the example set forth above, the voice recognition system could connect to the Yelp website (www.yelp.com) or a similar website, to obtain information related to the quality of a restaurant, operating hours and availability of reservations as appropriate. The voice recognition system 820, or the external website in this example, can connect to multiple websites as appropriate in order to obtain the information/perform the command spoken by user in the vehicle 802. For example, in the above example, after identifying the appropriate restaurant, the external voice recognition server 820 can connect to a reservation website/service such as Open Table, www.opentable.com to make dinner reservations.

After retrieving the requested information, the voice recognition server 802 transmits the information back to the vehicle 802 and the information/command is provided to the user. The information can be provided verbally using speakers in the vehicle 802, can be displayed to the user on a screen in the vehicle, a text message can be sent, or another communication method can be used. In providing the information to the user, certain information can be highlighted, and/or grayed out to provide information about that choice. For example, if a user requests information about good Japanese restaurants in the area, the vehicle could display multiple restaurants while highlighting those that are currently open or graying out those that are currently closed.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the present embodiments without departing from the spirit and scope of the embodiments.

What is claimed is:

1. A computer-implemented method in a vehicle, comprising:
    obtaining, by an in-vehicle system, a user voice input via at least one input device of the vehicle for at least generating a voice recognition result;
    obtaining user profile identifying information associated with a user of the vehicle providing the user voice input;
    determining, by the in-vehicle system, to process the user voice input using a system external to the vehicle, wherein the determining is based at least upon one or more characteristics of the user voice input;
    providing, by the in-vehicle system and based on determining to process the user voice input using the system external to the vehicle, the user voice input and the user profile identifying information to the system external to the vehicle;
    receiving, by the in-vehicle system and from the system external to the vehicle, the voice recognition result for the user voice input; and
    executing, by the in-vehicle system, a command identified based on the voice recognition result.

2. The method of claim 1, wherein the user profile identifying information includes one or more of key fob information of a key fob used to access the vehicle, a cellphone identifier of a cell phone associated with the user, facial features of the user, a weight of the user, or a driving habit identification identifying an observed driving habit of the vehicle by the user.

3. The method of claim 1, wherein the system external to the vehicle determines a user profile associated with the user based on the user profile identifying information, wherein the user profile is one of multiple user profiles associated with the vehicle.

4. The method of claim 3, wherein the system external to the vehicle obtains one or more parameters of the user profile based on the user profile identifying information, and wherein the system external to the vehicle processes the user voice input based on the one or more parameters to generate the voice recognition result and performs an action based on the voice recognition result.

5. The method of claim 4, wherein the one or more parameters of the user profile include an accent of the user, a pronunciation parameter associated with the user, a sentence structure associated with the user, a speech training parameter associated with the user, or information about tendencies of a user in operating the vehicle.

6. The method of claim 4, wherein the system external to the vehicle stores the user voice input and the voice recognition result in association with the user profile for use in processing subsequent user voice input, wherein the storing is based on determining that the voice recognition result achieves a threshold confidence score.

7. A computer-implemented method in a vehicle, comprising:

obtaining a user voice input via at least one input device of the vehicle;

determining, based on an identification of a vehicle model of the vehicle, a predetermined acoustical model defined for the vehicle model that specifies acoustics within the vehicle;

generating a voice recognition result from the user voice input based in part on the predetermined acoustical model;

determining whether to process the user voice input using an in-vehicle voice recognition system or a system external to the vehicle based at least upon one or more characteristics of the voice recognition result.

8. The method of claim 7, further comprising determining the identification of the vehicle model based on as a vehicle identification number (VIN) associated with the vehicle.

9. The method of claim 8, wherein the determining includes determining to process the user voice input using the system external to the vehicle, and wherein the system external to the vehicle determines the predetermined acoustical model based on the VIN associated with the vehicle.

10. The method of claim 9, wherein the system external to the vehicle determines the acoustical model associated with the vehicle based at least in part on one or more parameters associated with the vehicle received from the vehicle along with the user voice input.

11. The method of claim 7, further comprising adjusting the predetermined acoustical model based in part on one or more of vehicle speed, yaw, or location of the vehicle.

12. The method of claim 7, further comprising adjusting the predetermined acoustical model based in part on one or more of a fan status of a fan of the vehicle, a number of passengers detected in the vehicle, or a window position of one or more windows of the vehicle.

* * * * *